United States Patent
Ishigaki et al.

(10) Patent No.: US 10,118,982 B2
(45) Date of Patent: Nov. 6, 2018

(54) GRAFT COPOLYMER AND THERMOPLASTIC RESIN COMPOSITION

(71) Applicant: NIPPON A&L INC., Osaka-shi, Osaka (JP)

(72) Inventors: Kazuhiro Ishigaki, Niihama (JP); Kiyoshi Ikawa, Niihama (JP); Taisuke Yukawa, Takaishi (JP)

(73) Assignee: NIPPON A&L INC., Osaka (JP)

( * ) Notice: Subject to any disclaimer, the term of this patent is extended or adjusted under 35 U.S.C. 154(b) by 81 days.

(21) Appl. No.: 15/304,773

(22) PCT Filed: Apr. 17, 2015

(86) PCT No.: PCT/JP2015/061887
§ 371 (c)(1),
(2) Date: Oct. 17, 2016

(87) PCT Pub. No.: WO2015/159980
PCT Pub. Date: Oct. 22, 2015

(65) Prior Publication Data
US 2017/0037175 A1    Feb. 9, 2017

(30) Foreign Application Priority Data

Apr. 18, 2014 (JP) ................................ 2014-086536
Apr. 18, 2014 (JP) ................................ 2014-086537

(51) Int. Cl.
| | | |
|---|---|---|
| *C08F 255/02* | (2006.01) | |
| *C08F 255/00* | (2006.01) | |
| *C08L 51/06* | (2006.01) | |
| *C08L 69/00* | (2006.01) | |
| *C08F 255/10* | (2006.01) | |
| *C08L 25/12* | (2006.01) | |

(52) U.S. Cl.
CPC .......... *C08F 255/02* (2013.01); *C08F 255/00* (2013.01); *C08F 255/10* (2013.01); *C08L 25/12* (2013.01); *C08L 51/06* (2013.01); *C08L 69/00* (2013.01); *C08L 2205/035* (2013.01)

(58) Field of Classification Search
CPC ............................... C08F 255/02; C08L 25/12
See application file for complete search history.

(56) References Cited

U.S. PATENT DOCUMENTS

| | | | |
|---|---|---|---|
| 3,901,954 A | 8/1975 | Alberts et al. | |
| 5,314,912 A | 5/1994 | Yoshitani et al. | |
| 5,352,738 A * | 10/1994 | Hiromoto | C08L 25/12 |
| | | | 525/227 |
| 2018/0030275 A1* | 2/2018 | Cernohous | C08L 91/06 |

FOREIGN PATENT DOCUMENTS

| | | |
|---|---|---|
| CN | 1041765 A | 5/1990 |
| CN | 1047508 A | 12/1990 |
| CN | 1053614 A | 8/1991 |
| CN | 1054077 A | 8/1991 |
| CN | 1064685 A | 9/1992 |
| CN | 1122144 A | 5/1996 |
| CN | 1182440 A | 5/1998 |
| CN | 1206017 A | 1/1999 |
| CN | 1278274 A | 12/2000 |
| CN | 1300300 A | 6/2001 |
| CN | 1315971 A | 10/2001 |
| CN | 1342175 A | 3/2002 |
| CN | 1670049 A | 9/2005 |
| CN | 101072804 A | 11/2007 |
| CN | 101466809 A | 6/2009 |
| JP | S49-9594 A | 1/1974 |
| JP | H02-97550 A | 4/1990 |
| JP | H04-20550 A | 4/1992 |
| JP | H04-211447 A | 8/1992 |
| JP | 2000-038513 A | 2/2000 |
| JP | 2002-038034 A | 2/2002 |
| JP | 2015-108109 A | 6/2015 |

OTHER PUBLICATIONS

International Search Report and Written Opinion for Application No. PCT/JP2015/061887, dated Jul. 21, 2015, 5 pages.
Notification of Transmittal of Copies of Translation of the International Preliminary Report on Patentability (Chapter I or Chapter II) dated Oct. 27, 2016 for PCT Application No. PCT/JP2015/061887 (7 pages).

* cited by examiner

*Primary Examiner* — Jeffrey C Mullis
(74) *Attorney, Agent, or Firm* — Squire Patton Boggs (US) LLP

(57) ABSTRACT

Provided is a graft copolymer (A) obtainable by graft-polymerizing, in the presence of 30 to 80 parts by mass of an ethylene-based polymer (a), an aromatic vinyl-based monomer (b) and, if necessary, another vinyl-based monomer (c) copolymerizable with the aromatic vinyl-based monomer (b) in a total amount of 20 to 70 parts by mass (provided that the sum of the components (a), (b) and (c) is 100 parts by mass), in which the ethylene-based polymer (a) has a density of 0.900 g/cm$^3$ or more and less than 0.966 g/cm$^3$, a number average molecular weight of 10,000 to 50,000, and a molecular weight distribution of 5 to 15, and the proportion of the ethylene-based polymer (a) molecules having a molecular weight of 10,000 or less is 5.5% or more.

22 Claims, 2 Drawing Sheets

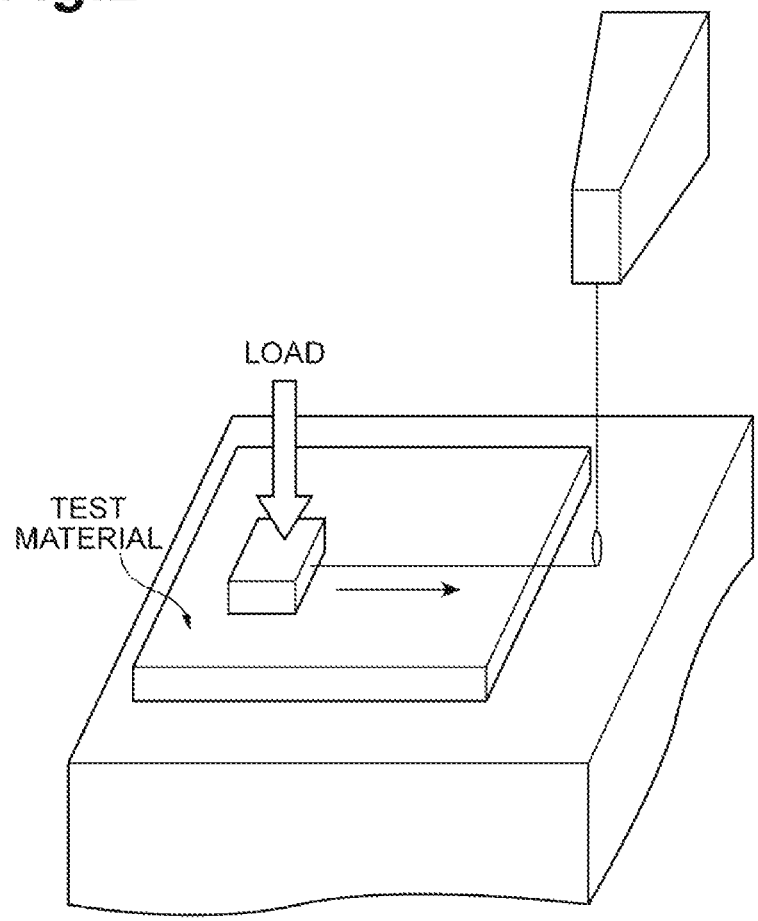

GRAFT COPOLYMER AND THERMOPLASTIC RESIN COMPOSITION

TECHNICAL FIELD

The present invention relates to a graft copolymer and a thermoplastic resin composition having the graft copolymer blended therein.

BACKGROUND ART

Thermoplastic resins, which are represented by styrene-based resins, are used as materials for vehicle interior components such as switches for car air-conditioners and car audio systems. It is well known that in a case in which molded articles produced using thermoplastic resins are assembled, interlocking parts of the molded articles or parts that are brought into contact with (rubbed with) components formed from materials of different kinds or materials of the same kind produce creaking sound, and that components wear away after being used for a long time.

In order to solve such problems, application of grease on the interlocking parts or contact parts of resin surfaces is implemented. However, since this application of grease requires time and expenses for operation, it is not economically efficient, and there are limitations on the sustenance of effects. Thus, for the purpose of promoting improvements in the sliding characteristics and the friction and abrasion characteristics of thermoplastic resins, Patent Literature 1 suggests a thermoplastic resin composition having a polyethylene having a particular molecular weight distribution blended therein. Furthermore, Patent Literature 2 suggests a thermoplastic resin composition in which a polyethylene having a particular density or molecular weight and a copolymer formed from a vinyl monomer are proportionally mixed.

CITATION LIST

Patent Literature

Patent Literature 1: Japanese Unexamined Patent Publication No. 2000-038513
Patent Literature 2: Japanese Unexamined Patent Publication No. H4-020550

SUMMARY OF INVENTION

Technical Problem

However, even with the polyethylene and the copolymer described above, there is a problem that in a case in which the polyethylene or the copolymer is proportionally mixed with a styrene-based resin or the like, which is not compatible with olefin-based polymers, laminar peeling (delamination) occurs, or a problem that an improvement in the sliding characteristics and amelioration of creaking sound has not yet been sufficiently achieved. Therefore, there is a demand for a resin modifier that does not easily cause delamination even when mixed with a thermoplastic resin, provides sufficient abrasion resistance and sliding characteristics, and can ameliorate creaking sound.

It is an object of the present invention to provide a resin modifier which does not easily cause delamination even when mixed with a thermoplastic resin, and can ameliorate abrasion resistance, sliding characteristics and creaking sound; and a thermoplastic resin composition having the resin modifier blended therein.

Solution to Problem

In order to solve the problems described above, the inventors of the present invention conducted a thorough investigation, and as a result, the inventors found that a graft copolymer obtained using a particular ethylene-based polymer functions as a resin modifier that can solve the problems described above. Thus, the inventors completed the present invention based on these findings.

That is, according to an aspect of the present invention, there is provided a graft copolymer (A) obtainable by graft-polymerizing, in the presence of 30 to 80 parts by mass of an ethylene-based polymer (a), an aromatic vinyl-based monomer (b) and, if necessary, another vinyl-based monomer (c) copolymerizable with the aromatic vinyl-based monomer (b) in a total amount of 20 to 70 parts by mass (provided that the sum of components (a), (b) and (c) is 100 parts by mass), in which the ethylene-based polymer (a) has a density of 0.900 $g/cm^3$ or higher and lower than 0.966 $g/cm^3$, a number average molecular weight of 10,000 to 50,000, and a molecular weight distribution of 5 to 15, and the proportion of the ethylene-based polymer molecules having a molecular weight of 10,000 or less is 5.5% or more.

The graft copolymer related to the aspect of the present invention can function as a resin modifier that does not easily cause delamination even when mixed with a thermoplastic resin, and can ameliorate abrasion resistance, sliding characteristics and creaking sound. Furthermore, the graft copolymer related to the aspect of the present invention can provide the effects described above while sufficiently maintaining the general properties of a thermoplastic resin.

According to another aspect of the present invention, there is provided a graft copolymer (A) obtainable by graft-polymerizing, in the presence of 30 to 80 parts by mass of an ethylene-based polymer (a), an aromatic vinyl-based monomer (b) and, if necessary, another vinyl-based monomer (c) copolymerizable with the aromatic vinyl-based monomer (b) in a total amount of 20 to 70 parts by mass (provided that the sum of components (a), (b) and (c) is 100 parts by mass), in which the ethylene-based polymer (a) has a density of 0.900 $g/cm^3$ or more and less than 0.966 $g/cm^3$, and a flow activation energy of 40 to 120 kJ/mol.

The graft copolymer related to the other aspect of the present invention can function as a resin modifier that does not easily cause delamination even when mixed with a thermoplastic resin, and can ameliorate abrasion resistance, sliding characteristics and creaking sound. Furthermore, the graft copolymer related to the other aspect of the present invention can provide the effects described above, while sufficiently maintaining heat resistance of the thermoplastic resin. Particularly, a thermoplastic resin that is used for vehicle interior components may need to have heat resistance; however, the graft copolymer related to the other aspect of the present invention can be adequately blended into a thermoplastic resin composition intended for forming a molded article that requires such heat resistance.

The graft copolymer related to the present invention preferably has a graft ratio of 30% or more.

In regard to the graft copolymer related to the present invention, it is preferable that the ethylene-based polymer (a) is an ethylene-α-olefin copolymer containing ethylene and an α-olefin having 3 to 20 carbon atoms as copolymerization components.

In regard to the graft copolymer related to the present invention, it is preferable that the number average particle size, [(long side+short side)/2], of the ethylene-based polymer (a) is 500 to 4,500 µm.

Furthermore, according to another aspect of the present invention, there is provided a thermoplastic resin composition including the graft copolymer (A) related to the present invention and a thermoplastic resin (B) other than the graft copolymer (A), in which the content of the graft copolymer (A) is 1 to 50 parts by mass, and the content of the thermoplastic resin (B) is 50 to 99 parts by mass, with respect to a total amount of 100 parts by mass of the graft copolymer (A) and the thermoplastic resin (B).

In regard to the thermoplastic resin composition related to the present invention, the thermoplastic resin (B) may be a styrene-based resin.

In regard to the thermoplastic resin composition related to the present invention, the thermoplastic resin (B) may be a polycarbonate resin.

In regard to the thermoplastic resin composition related to the present invention, the thermoplastic resin (B) may include a styrene-based resin and a polycarbonate resin.

Advantageous Effects of Invention

According to the present invention, a resin modifier that does not easily cause delamination even when mixed with a thermoplastic resin, and can ameliorate abrasion resistance, sliding characteristics and creaking sound while sufficiently maintaining general physical properties, can be provided.

When a thermoplastic resin composition having the resin modifier of the present invention blended therein is used, a molded article that does not easily undergo delamination while sufficiently maintaining the general physical properties of a thermoplastic resin, has satisfactory abrasion resistance and sliding characteristics, and has ameliorated creaking sound, can be provided.

Furthermore, according to the present invention, a resin modifier that does not easily cause delamination even when mixed with a thermoplastic resin, and can ameliorate abrasion resistance, sliding characteristics and creaking sound while sufficiently maintaining heat resistance, can be provided.

When a thermoplastic resin composition having the resin modifier of the present invention blended therein is used, a molded article that does not easily cause delamination while sufficiently maintaining heat resistance of the thermoplastic resin, has satisfactory abrasion resistance and sliding characteristics, and has ameliorated creaking sound, can be provided.

BRIEF DESCRIPTION OF DRAWINGS

FIG. 2 is a diagram concerning a friction test.

DESCRIPTION OF EMBODIMENTS

Figure 1:
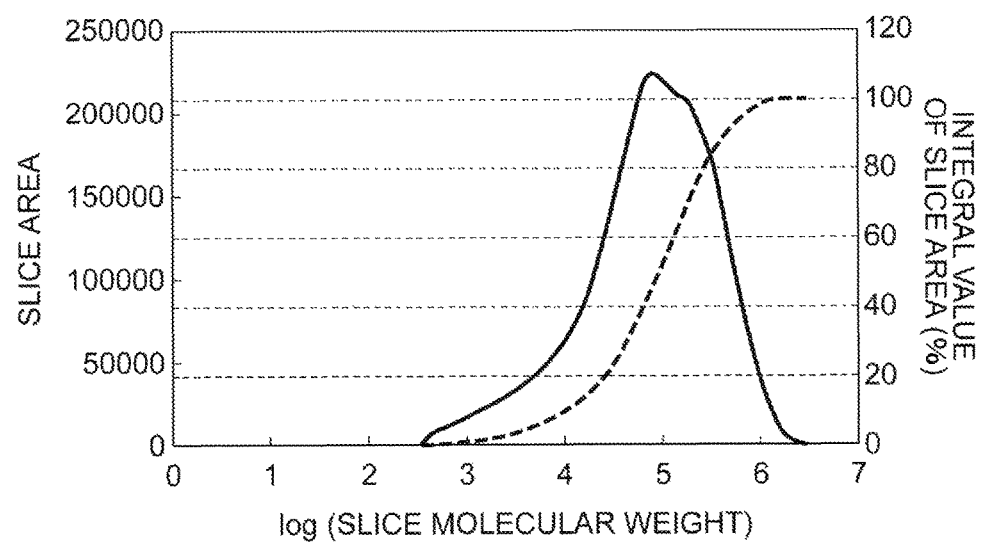
FIG. 1 is a diagram describing the occasion of determining the proportion of the ethylene-based polymer (a) molecules having a molecular weight of 10,000 or less.

Hereinafter, the graft copolymer of the present invention will be described in detail.

The graft copolymer of the present embodiment is a graft copolymer (A) obtainable by graft-polymerizing, in the presence of an ethylene-based polymer (a), an aromatic vinyl-based monomer (b) and, if necessary (optionally incorporated), another vinyl-based monomer (c) copolymerizable with the aromatic vinyl-based monomer (b).

Examples of the ethylene-based polymer (a) include polymers having a monomer unit based on ethylene as a main unit (usually, when the total amount of monomer units constituting the polymer is taken as 100 mol %, the content of the monomer unit based on ethylene is 50 mol % or more), such as an ethylene homopolymer, an ethylene-α-olefin copolymer, an ethylene-vinyl acetate copolymer, an ethylene-acrylic acid copolymer, an ethylene-acrylic acid ester copolymer, an ethylene-methacrylic acid copolymer, an ethylene-methacrylic acid ester copolymer, and an ethylene-cyclic olefin copolymer.

The ethylene homopolymer may be polyethylene. Furthermore, examples of the α-olefin of the ethylene-α-olefin copolymer include α-olefins having 3 to 20 carbon atoms, such as propylene, 1-butene, 1-pentene, 1-hexene, 1-heptene, 1-octene, 1-nonene, 1-decene, 1-dodecene, 4-methyl-1-pentene, and 4-methyl-1-hexene. These can be used singly or in combination of two or more kinds thereof.

Examples of the ethylene-α-olefin copolymer include an ethylene-propylene copolymer, an ethylene-1-butene copolymer, an ethylene-1-hexene copolymer, an ethylene-1-octene copolymer, and an ethylene-1-butene-1-hexene copolymer.

The ethylene-based polymer (a) is preferably an ethylene-α-olefin copolymer containing ethylene and an α-olefin having 3 to 20 carbon atoms as copolymerization components.

There are no limitations on the size of the ethylene-based polymer (a); however, the number average particle size [(long side+short side)/2] is preferably 500 to 4,500 µm, more preferably 700 to 3,500 µm, even more preferably 1,000 to 3,000 µm, and particularly preferably 1,000 to 2,700 µm.

The ethylene-based polymer (a) can be used in the form of pellets. In this case, as the surface area of the pellets is larger, it is easier for the monomers such as an aromatic vinyl-based monomer to be graft-polymerized. The number average particle size [(long side+short side)/2] of the pellets is preferably in the range described above.

From the viewpoint of ameliorating the abrasion resistance, sliding characteristics and creaking sound of the thermoplastic resin composition in a well-balanced manner, it is preferable that the ethylene-based polymer (a) has a density of 0.900 g/cm$^3$ or more and less than 0.966 g/cm$^3$, a number average molecular weight of 10,000 to 50,000, and a molecular weight distribution of 5 to 15, and that the proportion of the ethylene-based polymer molecules having a molecular weight of 10,000 or less is 5.5% or more. Meanwhile, the density is measured according to JIS K7112.

The number average molecular weight, the molecular weight distribution, and the proportion of polymer molecules having a molecular weight of 10,000 or less of the ethylene-based polymer (a) can be determined using gel permeation chromatography (GPC). Specifically, the weight average molecular weight and the number average molecular weight converted from a calibration curve using polystyrene standards are determined, and thus the molecular weight distribution, (weight average molecular weight/number average molecular weight), is calculated. The proportion of polymer molecules having a molecular weight of 10,000 or less is determined by, as illustrated in FIG. 1, drawing an integral curve of sliced areas from a molecular weight distribution curve based on sliced molecular weights and sliced areas, and obtaining the integral value (%) corresponding to a sliced molecular weight of 10,000.

Furthermore, from the viewpoint of ameliorating the abrasion resistance, the sliding characteristics and the creaking sound of the thermoplastic resin composition in a well-balanced manner, it is preferable that the ethylene-based polymer (a) has a density of 0.900 g/cm$^3$ or more and less than 0.966 g/cm$^3$, and a flow activation energy of 40 to 120 kJ/mol.

The flow activation energy of the ethylene-based polymer (a) is preferably 50 to 110 kJ/mol, and more preferably 60 to 100 kJ/mol. The flow activation energy of the ethylene-based polymer (a) can be regulated by, for example, the known technologies described in Japanese Patent No. 3344015 and Japanese Patent No. 4543706.

In regard to the flow activation energy of the ethylene-based polymer (a), a complex melt viscosity-angular frequency curve at 130° C., 150° C., 170° C. and 190° C. was measured under the measurement conditions described below, using a viscoelasticity analyzer (melt viscoelasticity analyzer ARES manufactured by TA Instruments Japan, Inc.), and then the activation energy (Ea) can be determined from the complex melt viscosity-angular frequency curve thus obtained, using a calculation software manufactured by TA Instruments Japan, Inc., TA ORCHESTRATOR SOFTWARE v7.0.8.23. Meanwhile, the Arrhenius type equation of shift factor ($a_T$) is expressed as follows:

$$\log(a_T) = Ea/R(1/T - 1/T_0)$$

[wherein R represents the gas constant; and $T_0$ represents the reference temperature (463 K)].

The Ea value obtained when the correlation coefficient r$^2$ obtainable by performing linear approximation in the Arrhenius type plot, $\log(a_T)$–(1/T), is 0.99 or more, is designated as the flow activation energy according to the present invention.

<Measurement Conditions>
Geometry: parallel plates
Plate diameter: 25 mm
Distance between plates (starting point of measurement): 1.5 mm
Strain: 5%
Angular frequency: 0.1 to 100 rad/sec
Measurement atmosphere: in nitrogen The density of the ethylene-based polymer (a) is preferably 0.905 g/cm$^3$ or more and less than 0.951 g/cm$^3$, more preferably 0.910 g/cm$^3$ or more and less than 0.941 g/cm$^3$, and particularly preferably 0.915 g/cm$^3$ or more and less than 0.931 g/cm$^3$.

There are no particular limitations on the melt flow rate of the ethylene-based polymer (a); however, from the viewpoint of ameliorating the sliding characteristics and the creaking sound in a well-balanced manner, the melt flow rate is preferably 0.3 to 5 (g/10 min). Meanwhile, the melt flow rate as used herein refers to a value measured according to JIS K7210 under the conditions of a temperature of 190° C. and a load of 21.2 N.

Examples of the aromatic vinyl-based monomer (b) include styrene, α-methylstyrene, para-methylstyrene, and bromostyrene. These can be used singly or in combination of two or more kinds thereof. Among these, styrene and α-methylstyrene are preferred.

Examples of the vinyl-based monomer (c) copolymerizable with the aromatic vinyl-based monomer (b) include vinyl cyanide-based monomers such as acrylonitrile, methacrylonitrile, ethacrylonitrile, and fumaronitrile; (meth) acrylic acid ester-based monomers such as methyl (meth) acrylate, ethyl (meth)acrylate, propyl (meth)acrylate, butyl (meth)acrylate, 2-ethylhexyl acrylate, phenyl (meth)acrylate, 4-t-butylphenyl (meth)acrylate, bromophenyl (meth) acrylate, dibromophenyl (meth)acrylate, 2,4,6-tribromophenyl (meth)acrylate, monochlorophenyl (meth)acrylate, dichlorophenyl (meth)acrylate, and trichlorophenyl (meth) acrylate; and maleimide-based monomers such as N-phenylmaleimide and N-cyclohexylmaleimide. These can be used singly or in combination of two or more kinds thereof.

The graft copolymer (A) of the present embodiment can be obtained by graft-polymerizing, in the presence of 30 to 80 parts by mass of an ethylene-based polymer (a), an aromatic vinyl-based monomer (b) and, if necessary, another vinyl-based monomer (c) copolymerizable with the aromatic vinyl-based monomer (b) in a total amount of 20 to 70 parts by mass (provided that the sum of components (a), (b) and (c) is 100 parts by mass).

If the content of the ethylene-based polymer (a) is less than 30 parts by mass, when the ethylene-based polymer is incorporated into the thermoplastic resin, it is difficult to obtain sufficient sliding characteristics. If the content is more than 80 parts by mass, when the ethylene-based polymer is incorporated into the thermoplastic resin, delamination may occur easily. The content of the ethylene-based polymer (a) is preferably 35 to 75 parts by mass, and more preferably 40 to 70 parts by mass.

In regard to the graft copolymer (A) of the present embodiment, when the sum of the aromatic vinyl-based monomer (b) and, if necessary, the vinyl-based monomer (c) copolymerizable with the aromatic vinyl-based monomer (b) is designated as 100 parts by mass, it is preferable that the aromatic vinyl-based monomer (b) is graft-polymerized at a proportion of 65 to 85 parts by mass, and it is more preferable that the aromatic vinyl-based monomer (b) is graft-polymerized at a proportion of 70 to 80 parts by mass.

There are no particular limitations on the graft ratio of the graft copolymer (A); however, from the viewpoint of suppressing delamination of the thermoplastic resin composition, the graft ratio is preferably 30% or more, and more preferably 40% or more.

There are no particular limitations on the method for producing the graft copolymer (A) of the present embodiment, and the graft copolymer (A) can be obtained by emulsion polymerization, suspension polymerization, bulk polymerization, solution polymerization, or a combination of these methods. However, it is preferable to use a suspension polymerization method.

Next, the thermoplastic resin composition related to the present invention will be described.

The thermoplastic resin composition of the present embodiment includes the graft copolymer (A) of the present embodiment as described above, and a thermoplastic resin (B) other than the graft copolymer (A).

There are no particular limitations on the type of the thermoplastic resin (B), and examples thereof include a styrene-based resin; an acrylic resin such as a polymethyl methacrylate resin; a polycarbonate-based resin; a polyester-based resin such as a polybutylene terephthalate resin or a polyethylene terephthalate resin; a polyamide-based resin; a biodegradable resin such as a polylactic acid resin; and engineering plastics such as a (modified) polyphenylene ether-based resin, a polyoxymethylene-based resin, a polysulfone-based resin, a polyallylate resin, a polyphenylene-based resin, and a thermoplastic polyurethane-based resin. These can be used singly or in combination of two or more kinds thereof. Among them, it is preferable that the thermoplastic resin (B) includes a styrene-based resin and/or a polycarbonate resin.

Examples of the styrene-based resin include a rubber-reinforced styrene-based resin and a non-rubber-reinforced styrene resin.

Specific examples of the rubber-reinforced styrene-based resin include a rubber-reinforced polystyrene resin (HIPS resin), an acrylonitrile-butadiene-based rubber-styrene polymer (ABS resin), an acrylonitrile-acrylic rubber-styrene polymer (AAS resin), a methyl methacrylate-butadiene-based rubber-styrene resin (MBS resin), and an acrylonitrile-ethylene-propylene-based rubber-styrene polymer (ABS resin).

Specific examples of the non-rubber-reinforced styrene-based resin include a styrene polymer (PS resin), a styrene-acrylonitrile copolymer (AS resin), an α-methylstyrene-acrylonitrile copolymer (α-MS-ACN resin), a methyl methacrylate-styrene copolymer (MS resin), a methyl methacrylate-acrylonitrile-styrene copolymer (MAS resin), a styrene-N-phenylmaleimide copolymer (S-NPMI resin), and a styrene-N-phenylmaleimide-acrylonitrile copolymer (S-A-NPMI resin).

The polycarbonate resin that can be used for the present embodiment is a polymer obtainable by a phosgene method of reacting various dihydroxydiaryl compounds with phosgene, or a transesterification method of reacting a dihydroxydiaryl compound with a carbonic acid ester such as diphenyl carbonate. A representative example may be a polycarbonate resin produced from 2,2-bis(4-hydroxyphenyl)propane; "bisphenol A".

Examples of the dihydroxydiaryl compound include, in addition to bisphenol A, bis(hydroxyaryl)alkanes such as bis(4-hydroxydiphenyl)methane, 1,1-bis(4-hydroxyphenyl)ethane, 2,2-bis(4-hydroxyphenyl)butane, 2,2-bis(4-hdyroxyphenyl)octane, bisbis(4-hydroxydiphenyl)phenylmethane, 2,2-bis(4-hydroxydiphenyl-3-methylphenyl)propane, 1,1-bis(4-hydroxy-3-tertiary butylphenyl)propane, 2,2-bis(4-hydroxy-3-bromophenyl)propane, 2,2-bis(4-hydroxy-3,5-dibromophenyl)propane, and 2,2-bis(4-hydroxy-3,5-dichlorophenyl)propane; bis(hydroxyaryl)cycloalkanes such as 1,1-bis(4-hydroxyphenyl)cyclopentane and 1,1-bis(4-hydroxyphenyl)cyclohexane; dihydroxydiaryl ethers such as 4,4'-dihydroxydiphenyl ether and 4,4'-dihydroxy-3,3'-dimethyldiphenyl ether; dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide; and dihydroxydiarylsulfones such as 4,4'-dihydroxydiphenylsulfone and 4,4'-dihydroxy-3,3'-dimethyldiphenylsulfone. These can be used singly or as mixtures of two or more kinds thereof.

In addition to those described above, piperazine, dipiperidylhydroquinone, resorcin, 4,4'-dihydroxydiphenyls, and the like may also be mixed.

Furthermore, mixtures of the dihydroxydiaryl compounds described above and trivalent or higher-valent phenolic compounds disclosed below may also be used. Examples of the trivalent or higher-valent phenols include phloroglucin, 4,6-dimethyl-2,4,6-tri(4-hydroxyphenyl)heptene-2,4,6-dimethyl-2,4,6-tri(4-hydroxyphenyl)heptane, 1,3,5-tri(4-hydroxyphenyl)benzole, 1,1,1-tri(4-hydroxyphenyl)ethane, and 2,2-bis(4,4'-(4,4'-hydroxydiphenyl)cyclohexyl)propane In a case in which the polycarbonate resin is produced, the weight average molecular weight is usually 10,000 to 80,000, and preferably 15,000 to 60,000. During the production, a molecular weight adjusting agent, a catalyst and the like can be used as necessary.

In regard to the thermoplastic resin composition of the present embodiment, it is preferable that, with respect to a total amount of 100 parts by mass of the graft copolymer (A) and the thermoplastic resin (B), the content of the graft copolymer (A) is 1 to 50 parts by mass, and the content of the thermoplastic resin (B) is 50 to 99 parts by mass. If the content of the graft copolymer (A) is more than 50 parts by mass, the intrinsic physical properties of the thermoplastic resin (B) may be easily impaired. The content of the graft copolymer (A) is preferably 3 to 40 parts by mass, and particularly preferably 5 to 30 parts by mass, with respect to a total amount of 100 parts by mass of the graft copolymer (A) and the thermoplastic resin (B).

As long as the purpose of the present invention is not impaired, the thermoplastic resin composition of the present embodiment can have incorporated thereinto known additives such as a pigment, a dye, a reinforcing agent (talc, mica, clay, glass fibers, or the like), an ultraviolet absorber, an oxidation inhibitor, a lubricating agent, a mold release agent, a plasticizer, a flame retardant, an antistatic agent, and inorganic and organic antibacterial agents, at the time of mixing of resins, at the time of molding, or the like according to the purpose.

The thermoplastic resin composition of the present embodiment can be obtained by mixing the components described above. For the mixing, for example, known kneading apparatuses such as an extruder, a roll, a Banbury mixer, and a kneader can be used. Also, there are no limitations on the order of mixing.

EXAMPLES

The present invention will be specifically described below by way of Examples; however, the present invention is not intended to be limited to these. Meanwhile, the units "parts" and "percent (%)" described in the Examples are on a mass basis.

<Preparation of Ethylene-Based Polymer>

Ethylene-based polymers (a-1), (a-2) and (a-3) shown below were prepared.

[Ethylene-Based Polymer (a-1)]

Manufactured by Sumitomo Chemical Co., Ltd., trade name "SUMIKATHENE EP GT140"

(ethylene-1-buene-1-hexene copolymer)

Fluidity: 0.9 (g/10 min)

Density: 0.918 (g/cm$^3$)

Number average molecular weight: 18,000

Weight average molecular weight: 180,000

Molecular weight distribution: 10

Proportion of molecules having molecular weight of 10,000 or less: 9.6(%)

Number average particle size: 3,700 μm

Flow activation energy: 70 (kJ/mol)

Number average particle size: 3,700 μm

[Ethylene-Based Polymer (a-2)]

Manufactured by Sumitomo Chemical Co., Ltd., trade name "SUMIKATHENE L405"

(low-density polyethylene)

Fluidity: 3.7 (g/10 min)

Density: 0.924 (g/cm$^3$)

Number average molecular weight: 38,200

Weight average molecular weight: 307,000

Molecular weight distribution: 8

Proportion of molecules having molecular weight of 10,000 or less: 5.0(%)

Number average particle size: 3,000 μm

[Ethylene-Based Polymer (a-3)]

Manufactured by Braskem S.A., trade name "SLH218"

Fluidity: 2.3 (g/10 min)

Density: 0.916 (g/cm$^3$)

Flow activation energy: 35 (kJ/mol)
Number average particle size: 5,000 μm
<Production of Graft Copolymer (A)>
[Graft Copolymer (A-1)]

Into a 100-L pressure-resistant vessel, 300 parts of deionized water, 0.12 parts of polyoxyethylene polyoxypropylene glycol (PLURONIC F-68), 0.6 parts of magnesium sulfate, and 60 parts of ethylene-based polymer (a-1) were introduced, and while the mixture was stirred, the tank was purged with nitrogen. Subsequently, mixed monomers composed of 24 parts of styrene, 16 parts of acrylonitrile, 1.1 parts of tert-butyl peroxypivalate (B(PV)), 0.1 parts of tert-butyl peroxy-2-ethylhexanoate (KAYAESTER O), and 0.05 parts of 1,4-benzoquinone, and 50 parts of deionized water were introduced thereinto, and the tank was purged with nitrogen. The temperature inside the tank was raised up to 85° C., and then after the temperature reached 85° C., a reaction was continuously carried out for 1 hour. After completion of the reaction, the temperature inside the tank was decreased to 40° C., and collection, washing, and drying were performed. Thus, graft copolymer (A-1) was obtained. Measurement of the graft ratio was performed by the method described below, and the graft ratio was 32%.

[Graft Copolymer (A-2)]

Into a 100-L pressure-resistant vessel, 300 parts of deionized water, 0.12 parts of polyoxyethylene polyoxypropylene glycol (PLURONIC F-68), 0.6 parts of magnesium sulfate, and 53 parts of the ethylene-based polymer (a-1) were introduced, and while the mixture was stirred, the tank was purged with nitrogen. Subsequently, mixed monomers composed of 30 parts of styrene, 17 parts of acrylonitrile, 1.1 parts of tert-butyl peroxypivalate (B(PV)), 0.1 parts of tert-butyl peroxy-2-ethylhexanoate (KAYAESTER O), and 0.05 parts of 1,4-benzoquinone, and 50 parts of deionized water were introduced thereinto, and the tank was purged with nitrogen. The temperature inside the tank was raised up to 85° C., and then after the temperature reached 85° C., a reaction was continuously carried out for 1 hour. After completion of the reaction, the temperature inside the tank was decreased to 40° C., and collection, washing, and drying were performed. Thus, graft copolymer (A-2) was obtained. Measurement of the graft ratio was performed by the method described below, and the graft ratio was 41%.

[Graft Copolymer (A-3)]

Into a 100-L pressure-resistant vessel, 300 parts of deionized water, 0.12 parts of polyoxyethylene polyoxypropylene glycol (PLURONIC F-68), 0.6 parts of magnesium sulfate, and 60 parts of the ethylene-based polymer (a-2) were introduced, and while the mixture was stirred, the tank was purged with nitrogen. Subsequently, mixed monomers composed of 24 parts of styrene, 16 parts of acrylonitrile, 1.1 parts of tert-butyl peroxypivalate (B(PV)), 0.1 parts of tert-butyl peroxy-2-ethylhexanoate (KAYAESTER O), and 0.05 parts of 1,4-benzoquinone, and 50 parts of deionized water were introduced thereinto, and the tank was purged with nitrogen. The temperature inside the tank was raised up to 85° C., and then after the temperature reached 85° C., a reaction was continuously carried out for 1 hour. After completion of the reaction, the temperature inside the tank was decreased to 40° C., and collection, washing, and drying were performed. Thus, graft copolymer (A-3) was obtained. Measurement of the graft ratio was performed by the method described below, and the graft ratio was 34%.

[Graft Copolymer (A-4)]

Into a 100-L pressure-resistant vessel, 300 parts of deionized water, 0.12 parts of polyoxyethylene polyoxypropylene glycol (PLURONIC F-68), 0.6 parts of magnesium sulfate, and 62 parts of the ethylene-based polymer (a-1) were introduced, and while the mixture was stirred, the tank was purged with nitrogen. Subsequently, mixed monomers composed of 23 parts of styrene, 15 parts of acrylonitrile, 1.1 parts of tert-butyl peroxypivalate (B(PV)), 0.1 parts of tert-butyl peroxy-2-ethylhexanoate (KAYAESTER O), and 0.05 parts of 1,4-benzoquinone, and 50 parts of deionized water were introduced thereinto, and the tank was purged with nitrogen. The temperature inside the tank was raised up to 85° C., and then after the temperature reached 85° C., a reaction was continuously carried out for 1 hour. After completion of the reaction, the temperature inside the tank was decreased to 40° C., and collection, washing and drying were performed. Thus, graft copolymer (A-1) was obtained. Measurement of the graft ratio was performed by the method described below, and the graft ratio was 36%.

[Graft Copolymer (A-5)]

Into a 100-L pressure-resistant vessel, 300 parts of deionized water, 0.12 parts of polyoxyethylene polyoxypropylene glycol (PLURONIC F-68), 0.6 parts of magnesium sulfate, and 50 parts of the ethylene-based polymer (a-1) were introduced, and while the mixture was stirred, the tank was purged with nitrogen. Subsequently, mixed monomers composed of 32 parts of styrene, 18 parts of acrylonitrile, 1.1 parts of tert-butyl peroxypivalate (B(PV)), 0.1 parts of tert-butyl peroxy-2-ethylhexanoate (KAYAESTER O), and 0.05 parts of 1,4-benzoquinone, and 50 parts of deionized water were introduced thereinto, and the tank was purged with nitrogen. The temperature inside the tank was raised up to 85° C., and then after the temperature reached 85° C., a reaction was continuously carried out for 1 hour. After completion of the reaction, the temperature inside the tank was decreased to 40° C., and collection, washing and drying were performed. Thus, graft copolymer (A-2) was obtained. Measurement of the graft ratio was performed by the method described below, and the graft ratio was 45%.

[Graft Copolymer (A-6)]

Into a 100-L pressure-resistant vessel, 300 parts of deionized water, 0.12 parts of polyoxyethylene polyoxypropylene glycol (PLURONIC F-68), 0.6 parts of magnesium sulfate, and 62 parts of the ethylene-based polymer (a-2) were introduced, and while the mixture was stirred, the tank was purged with nitrogen. Subsequently, mixed monomers composed of 23 parts of styrene, 15 parts of acrylonitrile, 1.1 parts of tert-butyl peroxypivalate (B(PV)), 0.1 parts of tert-butyl peroxy-2-ethylhexanoate (KAYAESTER O), and 0.05 parts of 1,4-benzoquinone, and 50 parts of deionized water were introduced thereinto, and the tank was purged with nitrogen. The temperature inside the tank was raised up to 85° C., and then after the temperature reached 85° C., a reaction was continuously carried out for 1 hour. After completion of the reaction, the temperature inside the tank was decreased to 40° C., and collection, washing and drying were performed. Thus, graft copolymer (A-3) was obtained. Measurement of the graft ratio was performed by the method described below, and the graft ratio was 30%.

<Measurement of Graft Ratio of Graft Copolymer>

The ethylene-based polymer percentage content (%) of the graft copolymer and the mass ratio (%) of a dichloromethane-insoluble fraction of the graft copolymer were measured by the methods described below, and the graft ratio was determined.

[Measurement of Ethylene-Based Polymer Percentage Content of Graft Copolymer]

The method will be described by taking graft copolymer (A-1) as an example. 92 parts of graft copolymer (A-1) was obtained after drying. The ethylene-based polymer content of graft copolymer (A-1) can be determined from the following expression (1), by assuming that 99% of the feed amount of the ethylene-based polymer (a-1) is incorporated into the graft copolymer.

$$\text{Ethylene-based polymer percentage content}(\%) = \qquad (1)$$
$$[\{\text{Feed amount (parts) of ethylene-based polymer} \times 0.99\}/$$
$$\text{mass(parts) of graft copolymer}] \times 100 =$$
$$[(62 \times 0.99)/92] \times 100 = 66.7(\%)$$

[Measurement of Graft Ratio]

The method will be described by taking graft copolymer (A-1) as an example. Graft copolymer (A-1) was subjected to a fractionation operation using dichloromethane, and thereby the mass ratio of a dichloromethane-insoluble fraction was determined. The mass ratio was 90.7%. Since the ethylene-based polymer exists in the dichloromethane-insoluble fraction, the graft ratio can be determined from the following expression (2).

$$\text{Graft ratio}(\%) = [\{\text{Mass ratio}(\%) \text{ of dichloromethane insoluble} \qquad (2)$$
$$\text{fraction} - \text{ethylene-based polymer percentage content}(\%)\}/$$
$$\text{ethylene-based polymer percentage content}(\%)] \times 100 =$$
$$(90.7 - 66.7)/66.7 \times 100 = 36(\%)$$

[Production of Rubber-Like Polymer (b-1)]

93 parts of 1,3-butadiene, 7 parts of styrene, 0.5 parts of n-dodecylmercaptan, 0.24 parts of potassium persulfate, 1.5 parts of sodium rosinate, 0.1 parts of sodium hydroxide, and 150 parts of deionized water were introduced into a pressure-resistant vessel, and the mixture was allowed to react for 15 hours at 70° C. Subsequently, the mixture was cooled, and the reaction was terminated. Thus, a rubber-like polymer (b-1) was obtained. The rubber-like polymer (b-1) thus obtained was stained with osmium tetroxide ($OsO_4$) and dried, and then pictures of the polymer were taken by transmission electron microscopy. The areas of 1,000 rubber particles were measured using an image analyzer (apparatus name: IP-1000PC manufactured by Asahi Kasei Corporation), and the equivalent circle diameters (diameter) of the particles were determined. Thus, the weight average particle size of the rubber-like polymer (b-1) was calculated. The weight average particle size was 0.10

[Production of Rubber-Like Polymer (b-2)]

A flocculation and enlargement treatment was performed using the rubber-like polymer (b-1) obtained as described above. 270 parts of the rubber-like polymer (b-1) and 0.055 parts of a 10% aqueous solution of sodium dodecyl benzene sulfonate were introduced into a stirred tank, and the mixture was stirred for 10 minutes. Subsequently, 0.8 parts of a 5% aqueous solution of phosphoric acid was added thereto over 10 minutes. Subsequently, 1 part of a 10% aqueous solution of potassium hydroxide was added thereto, and thereby rubber-like polymer (b-2) was obtained. The weight average particle size of the rubber-like polymer (b-2) thus obtained was measured by the method described above, and as a result, the weight average particle size was 0.35 μm.

[Production of Thermoplastic Resin (B-1)]

48 parts (solid content) of the rubber-like polymer (b-2), 140 parts of water, 0.1 parts of ethylenediamine tetraacetic acid sodium salt, 0.001 parts of ferrous sulfate, and 0.3 parts of sodium formaldehyde sulfoxylate were introduced into a reactor that had been purged with nitrogen. After heating at 60° C., a mixture including 39 parts of styrene, 13 parts of acrylonitrile, 0.6 parts of t-dodecylmercaptan and 0.2 parts of cumene hydroperoxide, and a mixture including 1.5 parts of potassium oleate and 15 parts of water were continuously added thereto for 4 hours. After completion of the addition, polymerization was further performed for 2 hours at 60° C. Subsequently, salting out, dehydration, and drying were performed, and thus thermoplastic resin (B-1), which was an acrylonitrile-butadiene-based rubber-styrene polymer, was obtained.

The graft ratio of the thermoplastic resin (B-1) thus obtained, and the reduced viscosity of an acetone-soluble fraction (measured at 30° C. as a N,N-dimethylformamide solution at 0.4 g/100 cc) were 40% and 0.39 dl/g, respectively. Meanwhile, the graft ratio was determined as described above, from the amount of an acetone-soluble fraction and the amount of an insoluble fraction of the graft copolymer, and the mass of composite rubber in the graft copolymer.

[Production of Thermoplastic Resin (B-2)]

A monomer mixture including 66.2 parts by weight of styrene, 22.1 parts by weight of acrylonitrile, 11.7 parts of ethylbenzene, and 0.35 parts by weight of t-dodecylmercaptan was continuously supplied to a reactor that had been purged with nitrogen, and polymerization was performed at 140° C. The polymerized liquid was led from the reactor to a separation and collection process composed of a preliminary heater and a vacuum chamber, and after collection and extrusion, thermoplastic resin (B-2), which was a styrene-acrylonitrile copolymer, was obtained. The reduced viscosity of thermoplastic resin (B-2) thus obtained by the method described above was 0.62 dl/g.

[Production of Thermoplastic Resin (B-3)]

A monomer mixture including 66.2 parts by weight of styrene, 22.1 parts by weight of acrylonitrile, 11.7 parts of ethylbenzene, and 0.40 parts by weight of t-dodecylmercaptan was continuously supplied to a reactor that had been purged with nitrogen, and polymerization was performed at 140° C. The polymerized liquid was led from the reactor to a separation and collection process composed of a preliminary heater and a vacuum chamber, and after collection and extrusion, thermoplastic resin (B-3), which was a styrene-acrylonitrile copolymer, was obtained. The reduced viscosity of thermoplastic resin (B-3) thus obtained by the method described above was 0.50 dl/g.

[Production of Thermoplastic Resin (B-4)]

A monomer mixture including 66.2 parts by weight of styrene, 22.1 parts by weight of acrylonitrile, 11.7 parts of ethylbenzene, and 0.55 parts by weight of t-dodecylmercaptan was continuously supplied to a reactor that had been purged with nitrogen, and polymerization was performed at 140° C. The polymerized liquid was led from the reactor to a separation and collection process composed of a preliminary heater and a vacuum chamber, and after collection and extrusion, thermoplastic resin (B-4), which was a styrene-acrylonitrile copolymer, was obtained. The reduced viscosity of thermoplastic resin (B-4) thus obtained by the method described above was 0.45 dl/g.

[Thermoplastic Resin (B-5)]

Polycarbonate resin: CALIBRE 200-15 manufactured by Sumika Styron Polycarbonate, Ltd.

Examples I-1 to I-9 and Comparative Examples I-1 to I-7

The graft copolymer (A) and the thermoplastic resin (B) were mixed at the compositions indicated in Table 1, and then the mixtures were melt kneaded using a 40-mm twin-screw extruder at 200° C. in Examples I-1, I-2, I-5 and I-6, and Comparative Examples I-1, I-3 and I-5; at 280° C. in Example I-9 and Comparative Example I-7; and at 250° C. in Examples and Comparative Examples other than these. Thus, pellets were obtained. Various injection molded articles were molded from the pellets thus obtained, using an injection molding machine that was set at 200° C. in Examples I-1, I-2, I-5 and I-6, and Comparative Examples I-1, I-3 and I-5; at 280° C. in Example I-9 and Comparative Example I-7; and at 250° C. in Examples and Comparative Examples other than these, and evaluation of physical properties was performed. The evaluation results are presented in Table 1. Furthermore, the respective evaluation methods are described below.

[Fluidity Test]

Fluidity: Evaluation was carried out by measuring the melt volume rates (at 300° C. with 1.2 kg in Example I-9 and Comparative Example I-7; and at 220° C. with 10 kg in Examples and Comparative Examples other than these) according to ISO 1133.

Unit: cm³/10 min

[Tensile Strength Test]

Tensile strength: according to ISO 527

Unit: MPa

[Delamination Test]

Incisions were inserted with a cutter at the gate part of a flat plate specimen (length×width×thickness=15 cm×9 cm×3 mm, glossy surface) obtained by injection molding the pellets thus obtained, and it was determined whether detachment occurred.

○: No detachment occurred.

X: Detachment occurred.

[Evaluation of Sliding Characteristics (Friction Test)]

The following lower surface specimen and upper surface specimen were prepared.

Lower surface specimen: Flat plate specimen (length× width× thickness=15 cm×9 cm×3 mm, glossy surface) obtained by injection molding the pellets thus obtained.

Upper surface specimen: Flat plate specimen (length× width× thickness=15 cm×9 cm×3 mm, glossy surface) obtained by injection molding a superheat resistant ABS resin (KU-630R-3 (manufactured by Nippon A & L, Inc.)) was cut into the size (length×width×thickness=4 cm×4 cm×3 mm).

The various specimens were left to stand for 24 hours in a thermostatic chamber at 23° C. and a humidity of 50%, and then two sheets of an upper surface specimen and a lower surface specimen (test materials in the diagram) were superposed as illustrated in FIG. 1. The test force produced when a load of 1.389 kg was applied on the upper surface specimen and the specimens were pulled at a constant speed of 50 mm per minute, was measured with a load cell, and the reduction rate was determined from the following expression (3). Thus, the sliding characteristics were evaluated in three grades.

$$\text{Reduction rate (\%)}=[(a-b)/a]\times 100 \quad (3)$$

a: Test force without addition of graft copolymer (A)

b: Test force under addition of graft copolymer (A)

(Evaluation)

○: Reduction rate 10% or higher

Δ: Reduction rate 5% or higher and less than 10%

X: Reduction rate less than 5%

The following lower surface test specimen and a cup-type molded article were prepared.

Lower surface specimen: Flat plate specimen (length× width× thickness=15 cm×9 cm×3 mm, glossy surface) obtained by injection molding the pellets thus obtained Cup-type molded article: Cup-type molded article (diameter×height×thickness×weight=6.2 cm×8.1 cm×2 mm×50 g) obtained by injection molding a superheat resistant ABS resin (KU-630R-3 (manufactured by Nippon A & L, Inc.))

The various specimens were left to stand for 24 hours in a thermostatic chamber at 23° C. and a humidity of 50%. Subsequently, the lower surface specimen was fixed at a tilt of 30° with respect to the horizontal, and the cup-type molded was gently placed thereon and was caused to slide 100 times. During this operation, the number of times of creaking sound generated was counted, and the amelioration ratio was determined from expression (4). Thus, the amelioration ratio was evaluated in two grades.

$$\text{Amelioration ratio (\%)}=[(a-b)/a]\times 100 \quad (4)$$

a: Number of times (times) of creaking sound generation without addition of graft copolymer (A)

b: Number of times (times) of creaking sound generation under addition of graft copolymer (A)

(Evaluation)

○: Amelioration ratio 30% or higher

X: Amelioration ratio lower than 30%

Examples I-10 to I-17 and Comparative Examples I-8 and I-9

The graft copolymer (A) and the thermoplastic resin (B) were mixed at the compositions indicated in Table 2, and then the mixtures were melt kneaded using a 40-mm twin-screw extruder at 200° C. in Examples I-10, I-11, I-14 and I-15, and Comparative Example I-8; and at 250° C. in Examples and Comparative Example other than these. Thus, pellets were obtained. Various injection molded articles were molded from the pellets thus obtained, using an injection molding machine set at 200° C. in Examples I-10, I-11, I-14 and I-15 and Comparative Example I-8; and at 250° C. in Examples and Comparative Example other than these. Thus, evaluation of abrasion resistance was carried out. The evaluation results are presented in Table 2. The evaluation method is described below.

[Evaluation of Abrasion Resistance]

A flat plate specimen (length×width×thickness=15 cm×15 cm×3 mm) obtained by injection molding the pellets thus obtained was cut into the size of length×width×thickness=9 cm×9 cm×3 mm, and a 6-mm hole was punched at the center of the flat plate specimen. This was prepared as a specimen. Various specimens were left to stand for 48 hours in a thermostatic chamber at 23° C. and a humidity of 50%, and then an abrasion test was performed using a Taber type abrasion tester under the conditions described below. Thus, the amount of abrasion was determined from expression (5), the reduction ratio was determined from expression (6), and these were evaluated in three grades.

(Conditions)

Wear ring: CS-17 (manufactured by Taber Industries, Inc.)

Load: 750 g, adjusted to 1,000 g including the weight of the tester arm

Number of table rotations: 1,000 times

Speed of rotation: 70 rpm $$\text{Amount of abrasion (mg)}=\text{Mass before test (mg)}-\text{mass after test (mg)}. \quad (5)$$

$$\text{Reduction ratio (\%)}=[(a-b)/a]\times 100 \quad (6)$$

a: Amount of abrasion (mg) without addition of graft copolymer (A)
b: Amount of abrasion (mg) under addition of graft copolymer (A)
(Evaluation)
⊙: Reduction rate more than 40%
○: Reduction rate 10% or more and less than 40%
X: Reduction rate less than 10% porated, and exhibited poor sliding characteristics and poor amelioration ratios for creaking sound. Comparative Examples I-5 and I-6 were examples in which an ethylene-based polymer that had not been graft polymerized was incorporated, and caused delamination.

As shown in Table 2, Examples I-10 to I-17 were examples of thermoplastic resin compositions in which the

TABLE 1

|  | Example |  |  |  |  |  |  |  |  | Comparative Example |  |  |  |  |  |  |
|---|---|---|---|---|---|---|---|---|---|---|---|---|---|---|---|---|
|  | I-1 | I-2 | I-3 | I-4 | I-5 | I-6 | I-7 | I-8 | I-9 | I-1 | I-2 | I-3 | I-4 | I-5 | I-6 | I-7 |
| Graft copolymer (A) | | | | | | | | | | | | | | | | |
| (A-1) | 3 | 10 | 3 | 10 | | | | | | | | | | | | |
| (A-2) | | | | | 3 | 10 | 3 | 10 | 3 | | | | | | | |
| (A-3) | | | | | | | | | | 3 | 3 | | | | | |
| (C-1)※1 | | | | | | | | | | | | | | 3 | 3 | |
| Thermoplastic resin (B) | | | | | | | | | | | | | | | | |
| (B-1) | 32.5 | 30 | 24 | 23 | 32.5 | 30 | 24 | 23 | | 32.5 | 24 | 33.5 | 25 | 32.5 | 24 | |
| (B-2) | 40.5 | 38 | | | 40.5 | 38 | | | | 40.5 | | 41.5 | | 40.5 | | |
| (B-3) | | | 24 | 22 | | | 24 | 22 | | | 24 | | 25 | | 24 | |
| (B-4) | 24 | 22 | | | 24 | 22 | | | | 24 | | 25 | | 24 | | |
| (B-5) | | | 49 | 45 | | | 49 | 45 | 97 | | 49 | | 50 | | 49 | 100 |
| Physical properties | | | | | | | | | | | | | | | | |
| Fluidity (cm³/10 min) | 26 | 26 | 11 | 11 | 28 | 26 | 11 | 11 | 16 | 27 | 11 | 29 | 12 | 25 | 11 | 15 |
| Tensile strength (MPa) | 42 | 40 | 48 | 46 | 42 | 40 | 48 | 46 | 59 | 42 | 48 | 42 | 49 | 42 | 48 | 61 |
| Characteristics | | | | | | | | | | | | | | | | |
| Delamination | ○ | ○ | ○ | ○ | ○ | ○ | ○ | ○ | ○ | ○ | ○ | ○ | ○ | X | X | ○ |
| Sliding (friction test) | ○ | ○ | ○ | ○ | ○ | ○ | ○ | ○ | ○ | X | Δ | X | X | ○ | ○ | X |
| Creaking sound | ○ | ○ | ○ | ○ | ○ | ○ | ○ | ○ | ○ | ○ | ○ | X | X | ○ | ○ | X |

※1 manufactured by Sumitomo Chemical Co., Ltd., trade name "SUMIKATHENE EP GT140" (ethylene-1-butene-1-hexene copolymer)

TABLE 2

|  | Example |  |  |  |  |  |  |  | Comparative Example |  |
|---|---|---|---|---|---|---|---|---|---|---|
|  | I-10 | I-11 | I-12 | I-13 | I-14 | I-15 | I-16 | I-17 | I-8 | I-9 |
| Graft copolymer (A) | | | | | | | | | | |
| (A-1) | 3 | 10 | 3 | 10 | | | | | | |
| (A-2) | | | | | 3 | 10 | 3 | 10 | | |
| Thermoplastic resin (B) | | | | | | | | | | |
| (B-1) | 32.5 | 30 | 24 | 23 | 32.5 | 30 | 24 | 23 | 33.5 | 25 |
| (B-2) | 40.5 | 38 | | | 40.5 | 38 | | | 41.5 | |
| (B-3) | | | 24 | 22 | | | 24 | 22 | | 25 |
| (B-4) | 24 | 22 | | | 24 | 22 | | | 25 | |
| (B-5) | | | 49 | 45 | | | 49 | 45 | | 50 |
| Physical properties | | | | | | | | | | |
| Abrasion resistance | ○ | ○ | ○ | ⊙ | ○ | ○ | ○ | ⊙ | X | X |

As shown in Table 1, Examples I-1 to I-9 were examples of thermoplastic resin compositions in which the graft copolymers (A) of the present invention were incorporated, and the compositions did not cause delamination and had satisfactory sliding characteristics and satisfactory amelioration ratios for creaking sound, while maintaining fluidity and tensile strength, which are general physical properties.

As shown in Table 1, Comparative Examples I-1 and I-2 were examples in which a graft copolymer (A) using an ethylene-based polymer that did not satisfy the requirements of the present invention, and exhibited poor sliding characteristics. Comparative Examples I-3, I-4 and I-7 were examples in which the graft copolymer (A) was not incorporated, and exhibited poor sliding characteristics and poor amelioration ratios for creaking sound.

graft copolymer (A) of the present invention were incorporated, and exhibited satisfactory amelioration ratios for abrasion resistance.

As shown in Table 2, Comparative Examples I-8 and I-9 were examples in which the graft copolymer (A) of the present invention were not incorporated, and exhibited poor amelioration ratios for abrasion resistance.

Examples II-1 to II-9 and Comparative Examples II-1 to II-7

The graft copolymer (A) and the thermoplastic resin (B) were mixed at the compositions indicated in Table 3, and then the mixtures were melt kneaded using a 40-mm twin-screw extruder at 200° C. in Examples II-1, II-2, II-5 and II-6, and Comparative Examples II-1, II-3 and II-5; at 280° C. in Example II-9 and Comparative Example II-7; and at 250° C. in Examples and Comparative Examples other than these. Thus, pellets were obtained. Various injection molded articles were molded from the pellets thus obtained, using an injection molding machine set at 200° C. in Examples II-1, II-2, II-5 and II-6, and Comparative Examples II-1, II-3 and II-5; at 280° C. in Example II-9 and Comparative Example II-7; and at 250° C. in Examples and Comparative Examples other than these, and evaluation of physical properties was performed. The evaluation results are presented in Table 3. The delamination test, evaluation of the sliding characteristics (friction test), and evaluation of the creaking sound characteristics were carried out as described above. The method for evaluating heat resistance is described below.

[Heat Resistance Test]

A specimen was molded according to ISO 294, and heat resistance was analyzed.

Regarding heat resistance, the deflection temperature under load at a load of 1.8 MPa was measured according to ISO 75.

Unit: ° C.

Examples II-10 to II-17 and Comparative Examples II-8 and II-9

The graft copolymer (A) and the thermoplastic resin (B) were mixed at the compositions indicated in Table 4, and then the mixtures were melt kneaded using a 40-mm twin-screw extruder at 200° C. in Examples II-10, II-11, II-14 and II-15, and Comparative Example II-8; and at 250° C. in Examples and Comparative Example other than these. Thus, pellets were obtained. Various injection molded articles were molded from the pellets thus obtained, using an injection molding machine set at 200° C. in Examples II-10, II-11, II-14 and II-15, and Comparative Example II-8; and 250° C. in Examples and Comparative Example other than these, and evaluation of abrasion resistance was carried out. The evaluation results are presented in Table 4. Evaluation of abrasion resistance was carried out as described above.

TABLE 3

|  | Example | | | | | | | | | Comparative Example | | | | | | |
| --- | --- | --- | --- | --- | --- | --- | --- | --- | --- | --- | --- | --- | --- | --- | --- | --- |
|  | II-1 | II-2 | II-3 | II-4 | II-5 | II-6 | II-7 | II-8 | II-9 | II-1 | II-2 | II-3 | II-4 | II-5 | II-6 | II-7 |
| Graft copolymer (A) | | | | | | | | | | | | | | | | |
| (A-4) | 3 | 10 | 3 | 10 | | | | | | | | | | | | |
| (A-5) | | | | | 3 | 10 | 3 | 10 | 3 | | | | | | | |
| (A-6) | | | | | | | | | | 3 | 3 | | | | | |
| (C-1)※1 | | | | | | | | | | | | | | 3 | 3 | |
| Thermoplastic resin (B) | | | | | | | | | | | | | | | | |
| (B-1) | 32.5 | 30 | 24 | 23 | 32.5 | 30 | 24 | 23 | | 32.5 | 24 | 33.5 | 25 | 32.5 | 24 | |
| (B-2) | 40.5 | 38 | | | 40.5 | 38 | | | | 40.5 | | 41.5 | | 40.5 | | |
| (B-3) | | | 24 | 22 | | | 24 | 22 | | | 24 | | 25 | | 24 | |
| (B-4) | 24 | 22 | | | 24 | 22 | | | | 24 | | 25 | | 24 | | |
| (B-5) | | | 49 | 45 | | | 49 | 45 | 97 | | 49 | | 50 | | 49 | 100 |
| Physical properties | | | | | | | | | | | | | | | | |
| Heat resistance (° C.) | 81 | 80 | 99 | 98 | 81 | 80 | 99 | 98 | 127 | 81 | 100 | 81 | 100 | 80 | 99 | 129 |
| Characteristics | | | | | | | | | | | | | | | | |
| Delamination | ◯ | ◯ | ◯ | ◯ | ◯ | ◯ | ◯ | ◯ | ◯ | ◯ | ◯ | ◯ | ◯ | X | X | ◯ |
| Sliding (friction test) | ◯ | ◯ | ◯ | ◯ | ◯ | ◯ | ◯ | ◯ | ◯ | X | X | X | X | ◯ | ◯ | X |
| Creaking sound | ◯ | ◯ | ◯ | ◯ | ◯ | ◯ | ◯ | ◯ | ◯ | X | X | X | X | ◯ | ◯ | X |

※1 Manufactured by Sumitomo Chemical Co., Ltd., trade name "SUMIKATHENE EP GT140" (ethylene-1-butene-1-hexene copolymer)

TABLE 4

|  | Example | | | | | | | | Comparative Example | |
| --- | --- | --- | --- | --- | --- | --- | --- | --- | --- | --- |
|  | II-10 | II-11 | II-12 | II-13 | II-14 | II-15 | II-16 | II-17 | II-8 | II-9 |
| Graft copolymer (A) | | | | | | | | | | |
| (A-4) | 3 | 10 | 3 | 10 | | | | | | |
| (A-5) | | | | | 3 | 10 | 3 | 10 | | |
| Thermoplastic resin (B) | | | | | | | | | | |
| (B-1) | 32.5 | 30 | 24 | 23 | 32.5 | 30 | 24 | 23 | 33.5 | 25 |
| (B-2) | 40.5 | 38 | | | 40.5 | 38 | | | 41.5 | |
| (B-3) | | | 24 | 22 | | | 24 | 22 | | 25 |
| (B-4) | 24 | 22 | | | 24 | 22 | | | 25 | |
| (B-5) | | | 49 | 45 | | | 49 | 45 | | 50 |
| Physical properties | | | | | | | | | | |
| Abrasion resistance | ◯ | ◯ | ◯ | ⊙ | ◯ | ◯ | ◯ | ⊙ | X | X |

As shown in Table 3, Examples II-1 to II-9 were examples of thermoplastic resin compositions in which the graft copolymers (A) of the present invention were incorporated, and the compositions did not cause delamination and exhibited satisfactory sliding characteristics and a satisfactory amelioration ratio for creaking sound, while maintaining heat resistance.

As shown in Table 3, Comparative Examples II-1 and II-2 were examples in which a graft copolymer (A) using an ethylene-based polymer that did not satisfy the requirements of the present invention was incorporated, and exhibited poor sliding characteristics and poor amelioration of creaking sound. Comparative Examples II-3, II-4 and II-7 were examples in which the graft copolymer (A) was not incorporated, and exhibited poor sliding characteristics and a poor amelioration ratio for creaking sound. Comparative Examples II-5 and II-6 were examples in which an ethylene-based polymer that had not been graft polymerized was incorporated, and caused delamination.

As shown in Table 4, Examples II-10 to II-17 were examples of thermoplastic resin compositions in which the graft copolymers (A) of the present invention were incorporated, and exhibited satisfactory amelioration ratios for abrasion resistance.

As shown in Table 4, Comparative Examples II-8 and II-9 were examples in which the graft polymer (A) of the present invention was not incorporated, and exhibited poor amelioration ratios for abrasion resistance.

INDUSTRIAL APPLICABILITY

As described above, a thermoplastic resin composition having the graft copolymer of the present invention incorporated thereinto can provide a molded article that does not cause delamination and has ameliorated sliding characteristics and creaking sound while maintaining general physical properties and/or heat resistance. Therefore, the thermoplastic resin composition is useful as, for example, a resin modifier for a creaking sound preventing material. Since a thermoplastic resin composition having the graft copolymer of the present invention incorporated thereinto can provide a molded article that does not cause delamination and has ameliorated sliding characteristics and creaking sound while maintaining heat resistance, the thermoplastic resin composition is useful as, for example, a resin modifier for a creaking sound preventing material.

The invention claimed is:

1. A graft copolymer (A) obtainable by graft-polymerizing:
   an aromatic vinyl-based monomer (b) in an amount of 20 to 70 parts by mass, in the presence of 30 to 80 parts by mass of an ethylene-based polymer (a) provided that the sum of components (a) and (b) is 100 parts by mass; or
   an aromatic vinyl-based monomer (b) and another vinyl-based monomer (c) copolymerizable with the aromatic vinyl-based monomer (b) in a total amount of 20 to 70 parts by mass, in the presence of 30 to 80 parts by mass of an ethylene-based polymer (a) provided that the sum of components (a), (b) and (c) is 100 parts by mass,
   wherein the ethylene-based polymer (a) has a density of 0.900 g/cm$^3$ or more and less than 0.966 g/cm$^3$, a number average molecular weight of 10,000 to 50,000, and a molecular weight distribution of 5 to 15, and the proportion of the ethylene-based polymer (a) molecules having a molecular weight of 10,000 or less is 5.5% or more.

2. The graft copolymer according to claim 1, wherein the graft ratio is 30% or higher.

3. The graft copolymer according to claim 1, wherein the ethylene-based polymer (a) is an ethylene-α-olefin copolymer containing ethylene and an α-olefin having 3 to 20 carbon atoms as copolymerization components.

4. The graft copolymer according to claim 1, wherein the number average particle size, [(long side+short side)/2], of the ethylene-based polymer (a) is 500 to 4,500 μm.

5. A graft copolymer (A) obtainable by graft-polymerizing:
   an aromatic vinyl-based monomer (b) in an amount of 20 to 70 parts by mass, in the presence of 30 to 80 parts by mass of an ethylene-based polymer (a) provided that the sum of components (a) and (b) is 100 parts by mass; or
   an aromatic vinyl-based monomer (b) and another vinyl-based monomer (c) copolymerizable with the aromatic vinyl-based monomer (b) in a total amount of 20 to 70 parts by mass, in the presence of 30 to 80 parts by mass of an ethylene-based polymer (a) provided that the sum of the components (a), (b) and (c) is 100 parts by mass,
   wherein the ethylene-based polymer (a) has a density of 0.900 g/cm$^3$ or more and less than 0.966 g/cm$^3$ and a flow activation energy of 40 to 120 kJ/mol.

6. The graft copolymer according to claim 5, wherein the graft ratio is 30% or higher.

7. The graft copolymer according to claim 5, wherein the ethylene-based polymer (a) is an ethylene-α-olefin copolymer containing ethylene and an α-olefin having 3 to 20 carbon atoms as copolymerization components.

8. The graft copolymer according to claim 5, wherein the number average particle size, [(long side+short side)/2], of the ethylene-based polymer (a) is 500 to 4,500 μm.

9. A thermoplastic resin composition comprising the graft copolymer (A) according to claim 1 and a thermoplastic resin (B) other than the graft copolymer (A),
   wherein the content of the graft copolymer (A) is 1 to 50 parts by mass, and the content of the thermoplastic resin (B) is 50 to 99 parts by mass, with respect to a total amount of 100 parts by mass of the graft copolymer (A) and the thermoplastic resin (B).

10. The thermoplastic resin composition according to claim 9, wherein the thermoplastic resin (B) is a styrene-based resin.

11. The thermoplastic resin composition according to claim 9, wherein the thermoplastic resin (B) is a polycarbonate resin.

12. The thermoplastic resin composition according to claim 9, wherein the thermoplastic resin (B) includes a styrene-based resin and a polycarbonate resin.

13. The graft copolymer according to claim 2, wherein the ethylene-based polymer (a) is an ethylene-α-olefin copolymer containing ethylene and an α-olefin having 3 to 20 carbon atoms as copolymerization components.

14. The graft copolymer according to claim 2, wherein the number average particle size, [(long side+short side)/2], of the ethylene-based polymer (a) is 500 to 4,500 μm.

15. The graft copolymer according to claim 13, wherein the number average particle size, [(long side+short side)/2], of the ethylene-based polymer (a) is 500 to 4,500 μm.

16. The graft copolymer according to claim 6, wherein the ethylene-based polymer (a) is an ethylene-α-olefin copolymer containing ethylene and an α-olefin having 3 to 20 carbon atoms as copolymerization components.

17. The graft copolymer according to claim 6, wherein the number average particle size, [(long side+short side)/2], of the ethylene-based polymer (a) is 500 to 4,500 μm.

18. The graft copolymer according to claim 16, wherein the number average particle size, [(long side+short side)/2], of the ethylene-based polymer (a) is 500 to 4,500 μm.

19. A thermoplastic resin composition comprising the graft copolymer (A) according to claim 5 and a thermoplastic resin (B) other than the graft copolymer (A),
    wherein the content of the graft copolymer (A) is 1 to 50 parts by mass, and the content of the thermoplastic resin (B) is 50 to 99 parts by mass, with respect to a total amount of 100 parts by mass of the graft copolymer (A) and the thermoplastic resin (B).

20. The thermoplastic resin composition according to claim 19, wherein the thermoplastic resin (B) is a styrene-based resin.

21. The thermoplastic resin composition according to claim 19, wherein the thermoplastic resin (B) is a polycarbonate resin.

22. The thermoplastic resin composition according to claim 19, wherein the thermoplastic resin (B) includes a styrene-based resin and a polycarbonate resin.

\* \* \* \* \*